United States Patent
Acharya et al.

(10) Patent No.: US 10,764,652 B2
(45) Date of Patent: Sep. 1, 2020

(54) FILLER DETECTION DURING TRICKPLAY

(71) Applicant: ARRIS Enterprises LLC, Suwanee, GA (US)

(72) Inventors: Belmannu Harekrishna Acharya, Bangalore (IN); Virendra Singh, Bangalore (IN); Lakshmi Arunkumar, Bangalore (IN); Aravind Soundararajan, Bangalore (IN); Sista Sarada Sastry, Bangalore (IN)

(73) Assignee: ARRIS ENTERPRISES LLC, Suwanee, GA (US)

( * ) Notice: Subject to any disclaimer, the term of this patent is extended or adjusted under 35 U.S.C. 154(b) by 50 days.

(21) Appl. No.: 15/529,979

(22) PCT Filed: Nov. 25, 2015

(86) PCT No.: PCT/US2015/062613
§ 371 (c)(1),
(2) Date: May 25, 2017

(87) PCT Pub. No.: WO2016/086100
PCT Pub. Date: Jun. 2, 2016

(65) Prior Publication Data
US 2018/0332360 A1  Nov. 15, 2018

(30) Foreign Application Priority Data

Nov. 25, 2014  (IN) .......................... 1235/KOL/2014
Nov. 24, 2015  (IN) .......................... 1235/KOL/2014

(51) Int. Cl.
*H04N 21/81* (2011.01)
*G11B 27/00* (2006.01)
(Continued)

(52) U.S. Cl.
CPC ....... *H04N 21/812* (2013.01); *G06Q 30/0269* (2013.01); *G11B 27/005* (2013.01);
(Continued)

(58) Field of Classification Search
None
See application file for complete search history.

(56) References Cited

U.S. PATENT DOCUMENTS 5,809,201 A * 9/1998 Nagasawa ............... H04N 19/61
386/314
6,064,794 A * 5/2000 McLaren ................. H04N 5/91
386/343

(Continued)

OTHER PUBLICATIONS

Examination Report, RE: India Application No. 1235/KOL/2014, dated Dec. 3, 2019.

*Primary Examiner* — An Son P Huynh
(74) *Attorney, Agent, or Firm* — Buchanan Ingersoll & Rooney PC

(57) ABSTRACT

Methods, systems, and computer readable media can be operable to facilitate the detection and management of a filler region during trickplay of a content stream. A filler region at the edge of a targeted advertisement segment may be detected based on the presence of one or more consecutive I-frames. When a filler region is detected during a trickplay operation, a corrective method may be applied during trickplay of the filler region. The corrective method may include a modification of a frame skip count (FSC) and/or frame repeat count (FRC) during trickplay of the filler region, or may include skipping over the processing and output of filler frames during trickplay of the filler region. In embodiments, an index file may be modified to include an indication of a designation of one or more frames as either a filler frame or non-filler frame.

14 Claims, 11 Drawing Sheets

(51) Int. Cl.
*G06Q 30/02* (2012.01)
*H04N 21/44* (2011.01)
*H04N 21/45* (2011.01)
*H04N 21/6587* (2011.01)
*H04N 21/845* (2011.01)

(52) U.S. Cl.
CPC ... *H04N 21/44016* (2013.01); *H04N 21/4532* (2013.01); *H04N 21/6587* (2013.01); *H04N 21/8455* (2013.01)

(56) References Cited

U.S. PATENT DOCUMENTS

| | | | | |
|---|---|---|---|---|
| 6,078,328 | A * | 6/2000 | Schumann | G06T 11/60 345/418 |
| 6,434,319 | B1 * | 8/2002 | Wine | H04N 5/783 386/230 |
| 7,764,863 | B1 * | 7/2010 | Strasman | H04N 5/783 386/343 |
| 7,779,438 | B2 * | 8/2010 | Davies | H04N 5/783 725/135 |
| 7,890,985 | B2 * | 2/2011 | Bowra | H04L 65/602 386/217 |
| 7,929,698 | B2 | 4/2011 | Candelore | |
| 8,539,535 | B2 * | 9/2013 | Hasek | H04N 7/17336 725/100 |
| 8,776,150 | B2 * | 7/2014 | Tian | H04N 7/17318 386/343 |
| 8,886,022 | B2 * | 11/2014 | Rodriguez | H04N 5/76 386/343 |
| 9,578,290 | B2 * | 2/2017 | Isaji | H04N 5/783 |
| 9,681,197 | B2 | 6/2017 | Panje et al. | |
| 2001/0043792 | A1 * | 11/2001 | Mishima | H04N 5/85 386/329 |
| 2001/0055471 | A1 * | 12/2001 | Nakatani | G11B 27/105 386/326 |
| 2002/0028061 | A1 * | 3/2002 | Takeuchi | H04N 19/587 386/248 |
| 2002/0144262 | A1 * | 10/2002 | Plotnick | G11B 27/005 725/32 |
| 2003/0081939 | A1 * | 5/2003 | Kim | G11B 27/005 386/214 |
| 2006/0013568 | A1 * | 1/2006 | Rodriguez | H04N 5/765 386/219 |
| 2006/0077127 | A1 * | 4/2006 | Sampsell | G09G 3/3466 345/55 |
| 2006/0117357 | A1 * | 6/2006 | Surline | H04N 5/783 725/90 |
| 2007/0248315 | A1 * | 10/2007 | Takeda | G10L 21/04 386/343 |
| 2008/0154941 | A1 * | 6/2008 | Park | H04N 21/2343 |
| 2008/0175559 | A1 * | 7/2008 | Jung | H04N 5/76 386/241 |
| 2008/0187283 | A1 * | 8/2008 | Takahashi | G11B 27/005 386/343 |
| 2008/0273698 | A1 * | 11/2008 | Manders | H04N 5/783 380/200 |
| 2008/0317246 | A1 * | 12/2008 | Manders | H04N 5/783 380/37 |
| 2009/0097819 | A1 * | 4/2009 | Dui | H04N 7/17336 386/343 |
| 2009/0129689 | A1 * | 5/2009 | Boyce | H04N 5/783 382/236 |
| 2009/0282444 | A1 * | 11/2009 | Laksono | H04N 7/17336 725/89 |
| 2010/0290537 | A1 * | 11/2010 | Moriyoshi | G11B 27/007 375/240.25 |
| 2010/0325660 | A1 * | 12/2010 | Holden | G11B 27/005 725/34 |
| 2012/0047282 | A1 * | 2/2012 | Mehta | H04N 19/172 709/231 |
| 2012/0183042 | A1 * | 7/2012 | Kiran | H04N 19/423 375/240.02 |
| 2012/0240174 | A1 * | 9/2012 | Rhyu | H04N 21/643 725/109 |
| 2016/0142746 | A1 * | 5/2016 | Schuberth | H04N 21/2387 725/31 |

* cited by examiner

| Frame # | ... | 100 | 101 | 102 | 103 | 104 | 105 | 106 | 107 | 108 | 109 | 110 | 111 | ... |
|---|---|---|---|---|---|---|---|---|---|---|---|---|---|---|
| Type | ... | P | B | — | P | P | — | — | — | — | P | P | — | ... |
| Filler | ... | N | N | N | N | N | Y | Y | Y | N | N | N | N | ... |

FIG. 10

FILLER DETECTION DURING TRICKPLAY

CROSS REFERENCE TO RELATED APPLICATION

This application is a U.S national stage application under 35 U.S.C 371 which claims the benefit of the following: Provisional Application Ser. No. 1235/KOL/2014, entitled "Method for Filler Detection and Smart Processing During Trickplay", which was filed on Nov. 25, 2014; India Utility Application No. 1235/KOL/2014, entitled "Filler Detection During TrickPlay", which was filed on Nov. 24, 2015; and corresponding to PCT International Application No. PCT/US15/62613, as filed on Nov. 25, 2015, each incorporated herein by reference in its entirety.

TECHNICAL FIELD

This disclosure relates to trickplay of a filler region.

BACKGROUND

A set-top box (STB) is typically provided by a multiple-systems operator (MSO) to a subscriber so that the subscriber may receive multimedia services offered by the MSO. The STB can be used by the subscriber to access a variety of multimedia services, including but not limited to live or linear television, digital video recorder (DVR) content, video-on-demand (VoD) content, over-the-top (OTT) content, and others.

Typically, content providers may deliver targeted advertisement content within a content stream, wherein the targeted advertisement content is selected based upon characteristics of an end-user receiving the content. Targeted advertisement may be achieved by the switching of an audio video (A/V) stream from network content to targeted advertisement content. Targeted advertisement content may be placed in a content stream between fillers so that the advertisement content may be presented to an end-user in a complete format rather than being interrupted by content acquisitions of various durations. These fillers are typically characterized by all frames being I-frames, thus the group of pictures (GOP) size (i.e., number of frames between two I-frames) is typically one for a filler region of a content stream.

When content is recorded at a set-top box (STB) or other customer premise equipment (CPE) device, the portion of a filler region that is received at the STB after the acquisition is recorded along with the advertisement content and kept in storage. As a result of the filler region characteristics, subsequent trickplay of the recorded content may present the filler frames for an extended duration. Because filler frames are typically blank images or screens (e.g., blue, black or any other color), extended presentation of the filler frames during trickplay can create an undesirable and frustrating presentation to the end user.

Typically, during trickplay of a recorded piece of content, only complete frames (e.g., I-frames) are processed and output to a display, and the speed of the trickplay is determined by the number of frames skipped between two presented I-frames. The relationship between a number of skipped frames (e.g., frame skip count (FSC)) and a given trickplay speed may be defined by a linear equation that also involves a frame repeat count (FRC) which is used to manage user perception of the trickplay speed. For example, the FRC may be set at a lower value for higher trickplay speeds to give the impression of speed.

The continuous I-frames making up a filler region of targeted advertisement content, though useful during playback to allow time for acquiring the new stream carrying the advertisement content, are not suitable when it comes to trickplay of the same content. For example, during trickplay of the content, the consecutive I-frames cause a longer duration display of the filler region. Moreover, at lower trickplay speeds the FRC is typically set to a higher value which causes every filler frame computed to be displayed for a longer duration. Further, the FRC value is typically computed from the GOP size of the content, but GOP size of the underlying content is not applicable to a filler region. A higher FRC value during trickplay of the filler region may cause an expansion in the display time of the filler region during trickplay. Therefore, it is desirable to improve upon methods and systems for carrying out a trickplay function on a filler region of a content stream.

BRIEF DESCRIPTION OF THE DRAWINGS

FIG. 10 is a block diagram illustrating an example frame index file associated with a piece of content.

Like reference numbers and designations in the various drawings indicate like elements.

DETAILED DESCRIPTION

Figure 1:
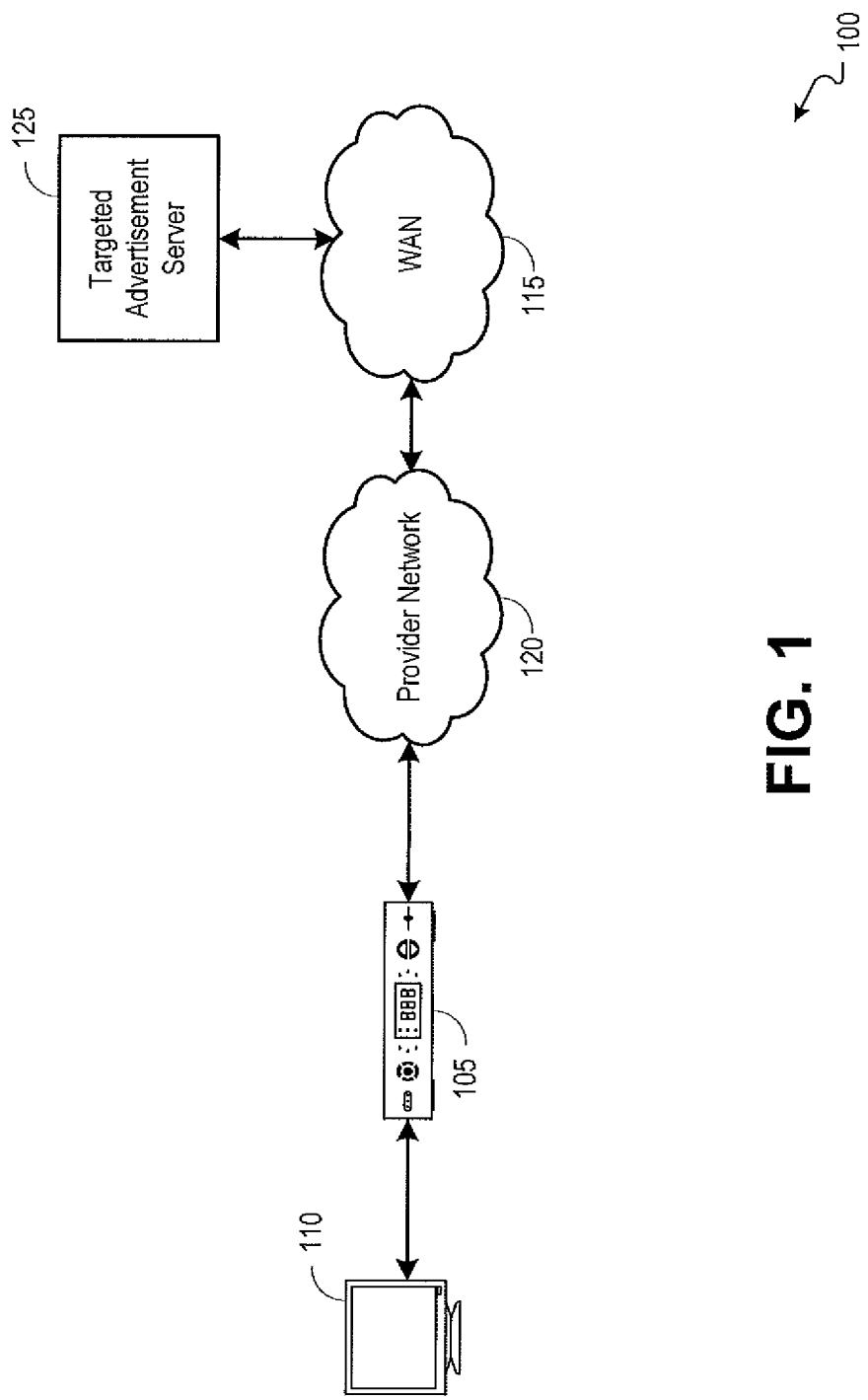
FIG. 1 is a block diagram illustrating an example network environment operable to facilitate the detection and management of a filler region during trickplay of a content stream.

It is desirable to improve upon methods and systems for carrying out a trickplay function on a filler region of a content stream. Methods, systems, and computer readable media can be operable to facilitate the detection and management of a filler region during trickplay of a content stream. A filler region at the edge of a targeted advertisement segment may be detected based on the presence of one or more consecutive I-frames. When a filler region is detected during a trickplay operation, a corrective method may be applied during trickplay of the filler region. The corrective method may include a modification of a frame skip count (FSC) and/or frame repeat count (FRC) during trickplay of the filler region, or may include skipping over the processing and output of filler frames during trickplay of the filler region. In embodiments, an index file may be modified to include an indication of a designation of one or more frames as either a filler frame or non-filler frame.

An embodiment of the invention described herein may include a method comprising: (a) initiating a trickplay of content, the trickplay of content comprising a processing and output of I-frames associated with the content to a display, wherein the content comprises a filler region; (b) detecting a beginning of the filler region based upon an identification of consecutive I-frames within the filler region; and (c) modifying the processing of I-frames during trickplay of the filler region.

According to an embodiment of the invention, modifying the processing of I-frames during trickplay of the filler region comprises reducing a frame repeat count value during trickplay of the filler region.

According to an embodiment of the invention, the frame repeat count value is reduced to a value of one.

According to an embodiment of the invention, modifying the processing of I-frames during trickplay of the filler region comprises increasing a frame skip count value during trickplay of the filler region.

According to an embodiment of the invention, the frame skip count value is increased to a value that is equivalent to a group of pictures size associated with a non-filler segment of the content.

According to an embodiment of the invention, modifying the processing of I-frames during trickplay of the filler region comprises reducing a frame repeat count value and increasing a frame skip count value during the trickplay of the filler region.

According to an embodiment of the invention, modifying the processing of I-frames during trickplay of the filler region comprises selecting only I-frames that are not immediately followed by another I-frame for processing.

According to an embodiment of the invention, the method described herein further comprises: (a) identifying and designating consecutive I-frames of the content as filler frames during a recording of the content, wherein the consecutive I-frames are designated as filler frames within a modified index file field; and (b) wherein modifying the processing of I-frames during trickplay of the filler region comprises selecting only frames that are not designated as filler frames for processing.

An embodiment of the invention described herein may include an apparatus comprising: (a) an interface configured to be used to receive content, wherein the content comprises a filler region; and (b) one or more modules configured to: (i) initiate a trickplay of the content, wherein trickplay of the content comprises a processing and output of I-frames associated with the content to a display; (ii) detect a beginning of the filler region based upon an identification of consecutive I-frames within the filler region; and (iii) modify the processing of I-frames during trickplay of the filler region.

An embodiment of the invention described herein may include one or more non-transitory computer readable media having instructions operable to cause one or more processors to perform the operations comprising: (a) initiating a trickplay of content, the trickplay of content comprising a processing and output of I-frames associated with the content to a display, wherein the content comprises a filler region; (b) detecting a beginning of the filler region based upon an identification of consecutive I-frames within the filler region; and (c) modifying the processing of I-frames during trickplay of the filler region.

FIG. 1 is a block diagram illustrating an example network environment 100 operable to facilitate the detection and management of a filler region during trickplay of a content stream. In embodiments, video, voice, and/or data services may be delivered to a subscriber premise through one or more customer premise equipment (CPE) devices. CPE devices may include a gateway device, modem, set-top box (STB) 105, and others.

In embodiments, various data, multimedia, and/or voice services may be delivered to a CPE device (e.g., STB 105), including but not limited to, live or broadcast television, video-on-demand (VoD) content, pay-per view content, recorded content (e.g., DVR content), audio-only content, streaming content, and others. The STB 105 may process and output content to one or more client devices such as a television 110, mobile device, tablet, computer, and any other device operable to receive video, voice, and/or data services.

In embodiments, multiple services (e.g., video, voice, and/or data services) may be delivered from a wide-area network (WAN) 115 to a STB 105 through a connection between the STB 105 and a provider network 120. The provider network 120 may include an optical network, hybrid fiber coaxial (HFC) network, digital subscriber line (DSL) network, twisted-pair, mobile network, high-speed data network, MoCA network, and others.

In embodiments, multimedia content may be delivered to a STB 105 as a transport stream carried by a channel (e.g., broadcast or linear channel, high-speed data channel, VoD channel, etc.). When the STB 105 is tuned to a certain channel, the STB 105 can identify and decode certain information within the transport stream, the certain information being associated with a piece of content that is of interest to a user. A transport stream may include a plurality of streams including, but not limited to a video stream, audio stream, data stream, and others.

In embodiments, a STB 105 may identify individual frames, packets and/or streams that are to be decoded and output based upon information received from a PMT. A PMT (e.g., PMT of a Moving Picture Experts Group (MPEG) transport stream) may include program information associated with a channel or program such as audio PIDs, video PIDs, program clock reference (PCR) PIDs, data PIDs, metadata associated with the channel or program, and other information. Using program information received from a PMT, a STB 105 may decode information carried by one or more streams within an associated transport stream. For example, a STB 105 may identify an audio and a video stream from within a transport stream, the identified audio and video streams being associated with content that is of interest to a user. The STB 105 may decode frames or packets carried by the audio and video streams to produce an audio/video output of the content, and the audio/video output may be presented to the user.

In embodiments, the STB 105 may receive targeted advertisement content embedded within or referenced by a content stream received at the STB 105. For example, targeted advertisement content may be embedded within a content stream by a targeted advertisement server 125, or targeted advertisement content may be retrieved for output to a display device from the targeted advertisement server 125. Targeted advertisement content may be received at a STB 105 by switching from an audio/video stream associated with content requested by a user to a stream carrying targeted advertisement content. Targeted advertisement content may include advertisement content selected for delivery to a user based on one or more parameters associated with the user (e.g., geographic location, demographic information, content viewing history, user preferences, etc.). It should be understood that multimedia content including targeted advertisement content may be recorded and stored at the STB 105 or at a remote server. For example, multimedia content including targeted advertisement content that is stored at a remote server may be delivered from the remote server to the STB 105 when requested by a user.

Targeted advertisement content may be received at a STB 105 as advertisement content that is between two filler regions. The filler regions may include a plurality of frames that are all I-frames (e.g., resulting in a blank screen during playback of the I-frames) and may serve as a buffer to account for the time taken for acquisition of the advertisement stream. When the STB 105 records the content stream that includes the targeted advertisement content, the filler regions may be recorded and stored along with the content stream.

When a trickplay (e.g., rewind, fast-forward, skip, etc.) function is carried out on a piece of recorded content during playback of the content, only I-frames of the underlying content stream may be presented at an associated display device (e.g., television 110). The speed of the trickplay may be controlled by the number of frames (e.g., I-frames) that are skipped between two frames presented at the display device. For example, frame skip count (FSC) and frame repeat count (FRC) values may be used to control the output of content stream frames during a trickplay function to manage user perception of the speed of the trickplay.

In embodiments, a filler region within a content stream may be detected. A filler region of a content stream may be identified by a STB 105 based on the presence of consecutive I-frames within the content stream. For example, a filler frame may be an I-frame that is immediately followed by another I-frame. When a filler region is detected within a content stream, the STB 105 may apply a trickplay management technique during trickplay of the filler region. For example, processing and presentation of frames included within a detected filler region may be altered to alleviate or eliminate the undesirable effects of the presentation of filler regions during a trickplay of a content stream.

In embodiments, the management technique applied during trickplay of targeted advertisement content may include a modification of a FSC and/or FRC value. For example, the FRC value may be reduced to one, and/or the FSC value may be set to a value equal to a group of pictures (GOP) size associated with non-filler regions of the advertisement content or other content. It should be understood that the management technique applied during trickplay of targeted advertisement content may include any of various other techniques for minimizing the display time of a filler frame during a trickplay.

In embodiments, the management technique applied during trickplay of targeted advertisement content may include skipping the processing of consecutive I-frames. For example, after detecting consecutive I-frames making up a filler region, the STB 105 may identify a first non-consecutive I-frame, and may skip over the consecutive I-frames and commence with frame processing at the identified non-consecutive I-frame.

In embodiments, frames associated with a content stream may be identified and designated as either a filler frame or a non-filler frame during a recording of the content stream at the STB 105. For example, consecutive I-frames may be identified and designated as filler frames. It should be understood that the designation of frames as either a filler frame or non-filler frame may be carried out by a server upstream from the STB 105. Frame index information may be modified to include the designation of the frame as either a filler frame or non-filler frame. The management technique applied during trickplay of the recorded content may include a treatment decision that is based on the designation of each frame. For example, during a trickplay of the recorded content stream, the STB 105 may skip the processing and output of frames designated as filler frames.

Figure 2:
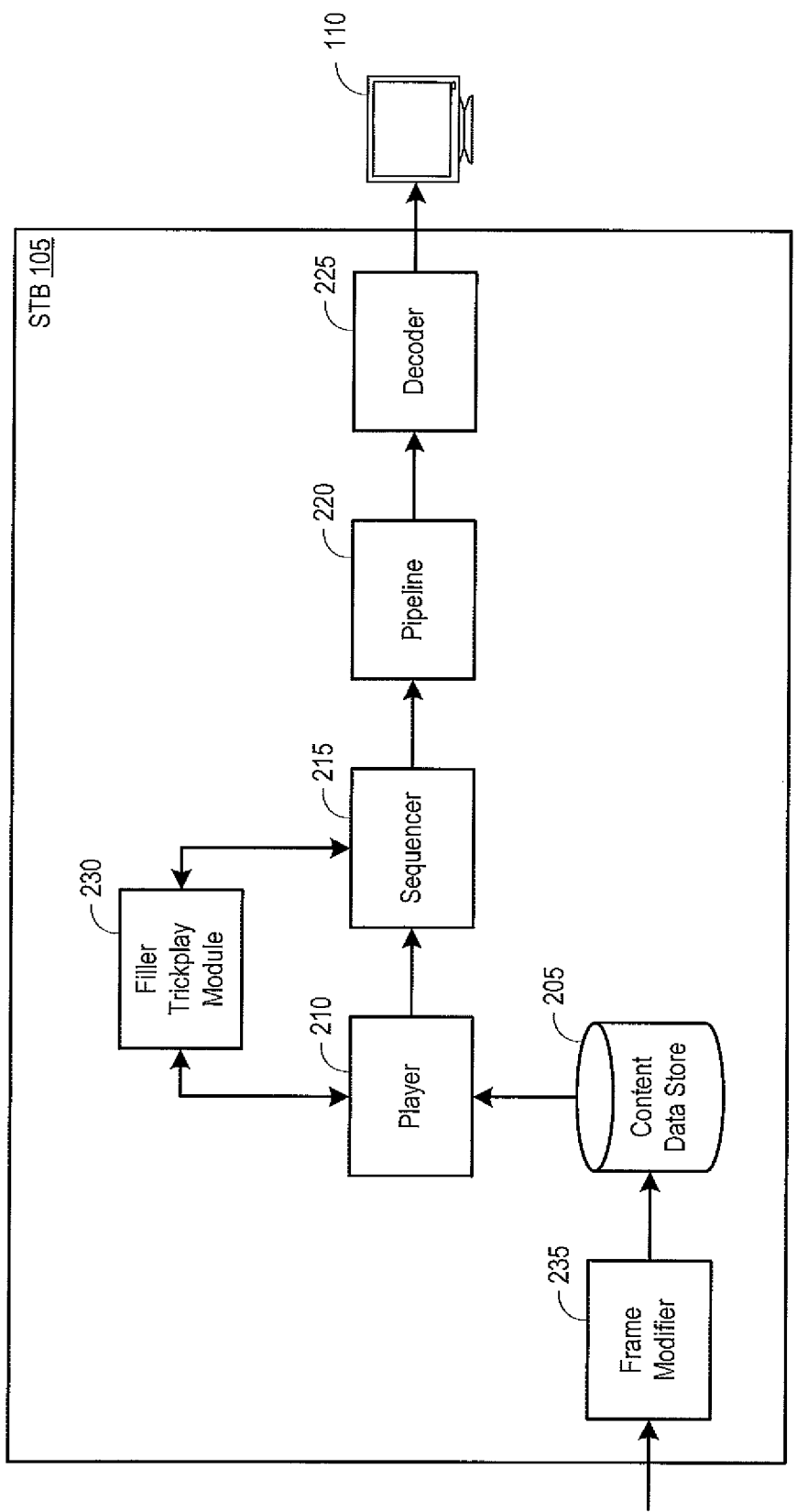
FIG. 2 is a block diagram illustrating an example STB operable to facilitate the detection and management of a filler region during trickplay of a content stream.

FIG. 2 is a block diagram illustrating an example STB 105 operable to facilitate the detection and management of a filler region during trickplay of a content stream. The STB 105 may include a content data store 205, a player 210, a sequencer 215, a pipeline 220, a decoder 225, a filler trickplay module 230, and a frame modifier 235.

In embodiments, a content stream may be received at the STB 105 and may be recorded and stored at the content data store 205. Targeted advertisement content received along with the content stream may also be recorded and stored at the content data store 205 with the content stream. Targeted advertisement content may include a filler region (e.g., one or more consecutive I-frames) at the beginning of the targeted advertisement content and a filler region at the end of the targeted advertisement content.

In embodiments, during playback of a recorded piece of content, when a user initiates a trickplay (e.g., rewind, fast-forward, skip, etc.) of the content, the player 210 may search a list of indexes associated with the recorded content and may identify I-frames associated with the recording. The identified I-frames may be fed from the player 210 to a sequencer 215, and the sequencer may push the I-frames, in order, to a pipeline 220. The pipeline 220 may maintain the flow of frames associated with the recording to the decoder 225. In embodiments, the decoder 225 may include a buffer, and the decoder 225 may read frames from the buffer, decode the frames, and present the frames. For example, the decoder 225 may output decoded frames to a display device (e.g., television 110).

In embodiments, the filler trickplay module 230 may detect a filler region of a content stream during a trickplay of the content stream. The filler trickplay module 230 may monitor the sequencer 215, and when consecutive I-frames are identified at the sequencer 215, the filler trickplay module 230 may determine that the consecutive I-frames make up a filler region. In response to the detection of a filler region at the sequencer 215, the filler trickplay module 230 may apply a corrective method during the trickplay of the filler region.

In embodiments, the corrective method may include a reduction of a FRC value. For example, the FRC value may be reduced to a value of one (1), such that the sequencer 215 processes the I-frames of the filler region at a faster rate.

In embodiments, the corrective method may include an increase of a FSC value. For example, the FSC value may be set to a value that is equivalent to the GOP size of the advertisement content or other content associated with the filler region. By applying an increased FSC to the trickplay of the filler region, fewer I-frames associated with the filler region may be presented as more of the filler region frames are skipped.

In embodiments, the corrective method may include both a reduction of the FRC value and an increase of the FSC value, thereby causing the filler region, or at least a significant portion of the filler region to be skipped during trickplay.

In embodiments, the filler trickplay module 230 may monitor the player 210 and may detect a filler region when consecutive I-frames are identified by the player 210 while the player 210 is searching through the indexes stored at the content data store 205 for I-frames with which to feed the sequencer 215. When the filler trickplay module 230 detects a filler region, the filler trickplay module 230 may cause the player 210 to skip over the filler frames and to identify the next non-filler frame (e.g., the next I-frame of the content stream that is not immediately followed by another I-frame). For example, the player 210 may refrain from feeding the detected filler frames to the sequencer 215 and may instead identify the next non-filler frame and feed the identified next non-filler frame to the sequencer 215.

In embodiments, the filler modifier 235 may identify and designate each frame of a recorded piece of content as either a filler frame or a non-filler frame. For example, the filler modifier 235 may identify and designate each consecutive I-frame of a content stream as a filler frame and may identify and designate each non-consecutive I-frame of the content stream as a non-filler frame. The filler modifier 235 may modify each frame or an index associated with the content stream to indicate the filler/non-filler designation of each frame within the content stream. The modified frames or index may be stored along with the recorded content at the content data store 205. During a trickplay of the recorded content, the player 210 may identify filler frames based on the stored filler/non-filler designation of each I-frame, and the player 210 may skip over filler frames and feed only non-filler frames to the sequencer 215 for processing.

Figure 3:
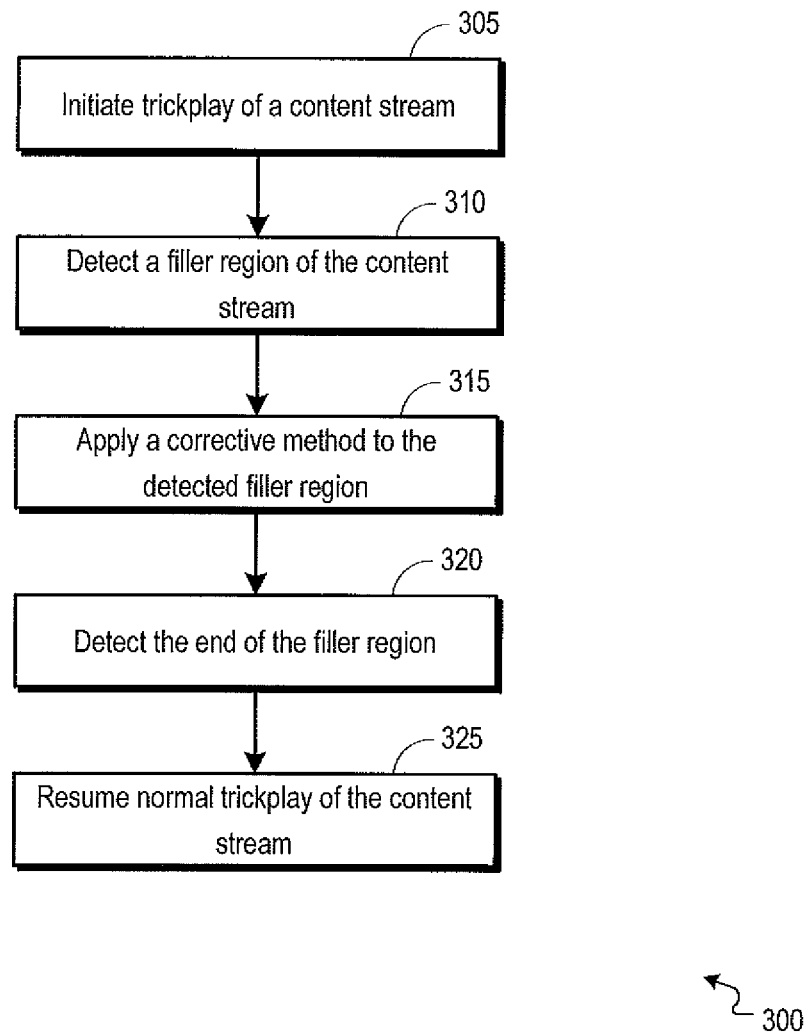
FIG. 3 is a flowchart illustrating an example process operable to facilitate the detection of a filler region and the application of a corrective method during trickplay of a content stream.

FIG. 3 is a flowchart illustrating an example process 300 operable to facilitate the detection of a filler region and the application of a corrective method during trickplay of a content stream. The process 300 may begin at 305 when a trickplay (e.g., rewind, fast-forward, skip, etc.) of a content stream is initiated. The content stream may be a recorded piece of content that is stored at a STB 105 of FIG. 1 (e.g., content data store 205 of FIG. 2). The recorded piece of content may include one or more targeted advertisement content segments, and each targeted advertisement content segment may be in between two filler regions. In embodiments, a filler region may include one or more consecutive I-frames.

In embodiments, the speed of a trickplay function may be controlled by the rate at which I-frames of the recorded content are fed from the content data store 205 to a sequencer 215 of FIG. 2 by a player 210 of FIG. 2. The speed of a trickplay function may further be controlled by the number I-frames between I-frames that are consecutively fed to the sequencer 215. For example, the speed of a trickplay function may be managed by the setting of a FRC and/or FSC value at the STB 105.

At 310, a filler region of the content stream may be detected. A filler region may be detected, for example, by a STB 105 component (e.g., player 210, sequencer 215, filler trickplay module 230 of FIG. 2, etc.). In embodiments, a filler region may be detected based upon the type of frame following an I-frame. For example, a filler region may include consecutive I-frames (e.g., at least one I-frame that is immediately followed in the content stream by another I-frame). A filler region may be detected by a filler trickplay module 230 when consecutive I-frames are returned by a sequencer 215.

At 315, a corrective method may be applied to the trickplay of the detected filler region. The corrective method may be applied, for example, by a filler trickplay module 230. In embodiments, the corrective method may be an adjustment of a FRC and/or FSC value during trickplay of the filler region. The corrective method may be an identification and skipping of filler frames during trickplay of the content stream.

At 320, the end of the filler region may be detected. The end of the filler region may be detected, for example, by a STB 105 component (e.g., player 210, sequencer 215, filler trickplay module 230 of FIG. 2, etc.). In embodiments, the end of the filler region may be detected based on an identification of a non-consecutive I-frame (e.g., an I-frame that is not immediately followed by another I-frame). Once the end of the filler region is detected, the corrective method may be terminated and normal trickplay of the content stream may be resumed at 325.

Figure 4:
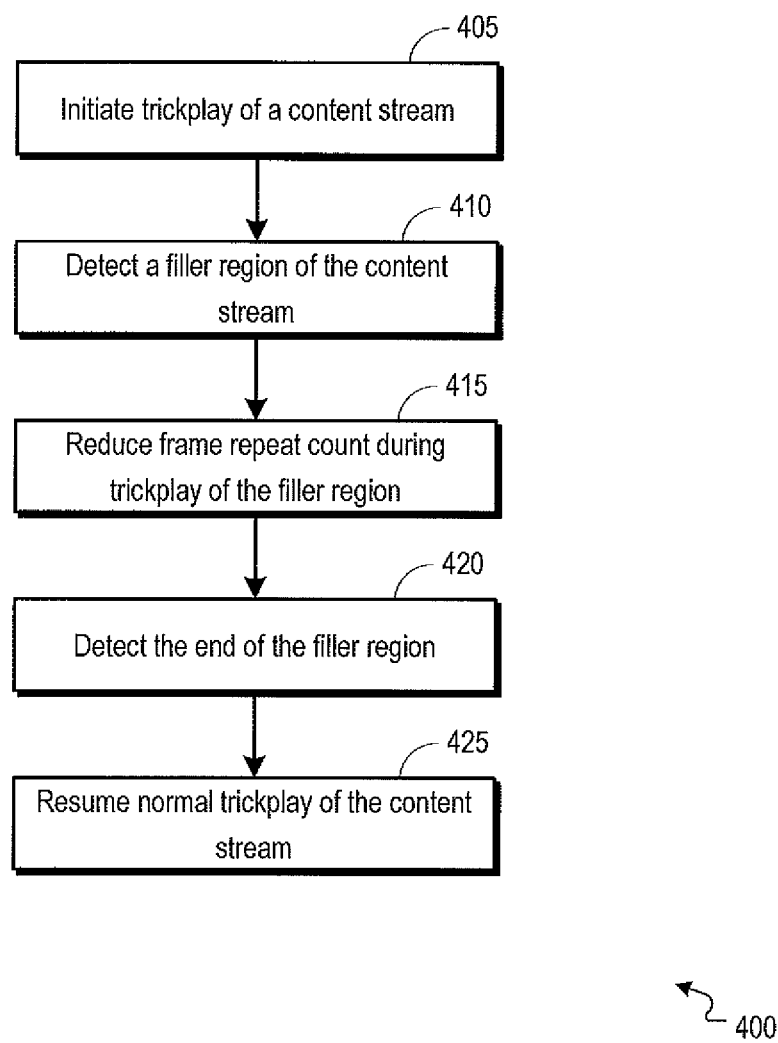
FIG. 4 is a flowchart illustrating an example process operable to facilitate the detection of a filler region and the reduction of a frame repeat count (FRC) value during trickplay of a content stream.

FIG. 4 is a flowchart illustrating an example process 400 operable to facilitate the detection of a filler region and the reduction of a frame repeat count (FRC) value during trickplay of a content stream. The process 400 may begin at 405 when a trickplay (e.g., rewind, fast-forward, skip, etc.) of a content stream is initiated. The content stream may be a recorded piece of content that is stored at a STB 105 of FIG. 1 (e.g., content data store 205 of FIG. 2). The recorded piece of content may include one or more targeted advertisement content segments, and each targeted advertisement content segment may be in between two filler regions. In embodiments, a filler region may include one or more consecutive I-frames.

In embodiments, the speed of a trickplay function may be controlled by the rate at which I-frames of the recorded content are fed from the content data store 205 to a sequencer 215 of FIG. 2 by a player 210 of FIG. 2. The speed of a trickplay function may further be controlled by the number of I-frames between I-frames that are consecutively fed to the sequencer 215. For example, the speed of a trickplay function may be managed by the setting of a FRC and/or FSC value at the STB 105.

At 410, a filler region of the content stream may be detected. A filler region may be detected, for example, by a STB 105 component (e.g., player 210, sequencer 215, filler trickplay module 230 of FIG. 2, etc.). In embodiments, a filler region may be detected based upon the type of frame following an I-frame. For example, a filler region may include one or more consecutive I-frames (e.g., at least one I-frame that is immediately followed in the content stream by another I-frame). A filler region may be detected by a filler trickplay module 230 when consecutive I-frames are returned by a sequencer 215.

At 415, a FRC value may be reduced during trickplay of the detected filler region. The FRC value may be reduced, for example, by a filler trickplay module 230. In embodiments, the FRC value may be dropped to a value of one (1), thus causing the I-frames of the filler region to be processed and output at a faster rate by the STB 105.

At 420, the end of the filler region may be detected. The end of the filler region may be detected, for example, by a STB 105 component (e.g., player 210, sequencer 215, filler trickplay module 230 of FIG. 2, etc.). In embodiments, the end of the filler region may be detected based on an identification of a non-consecutive I-frame (e.g., an I-frame that is not immediately followed by another I-frame). Once the end of the filler region is detected, the FRC value may be reset and normal trickplay of the content stream may be resumed at 425.

Figure 5:
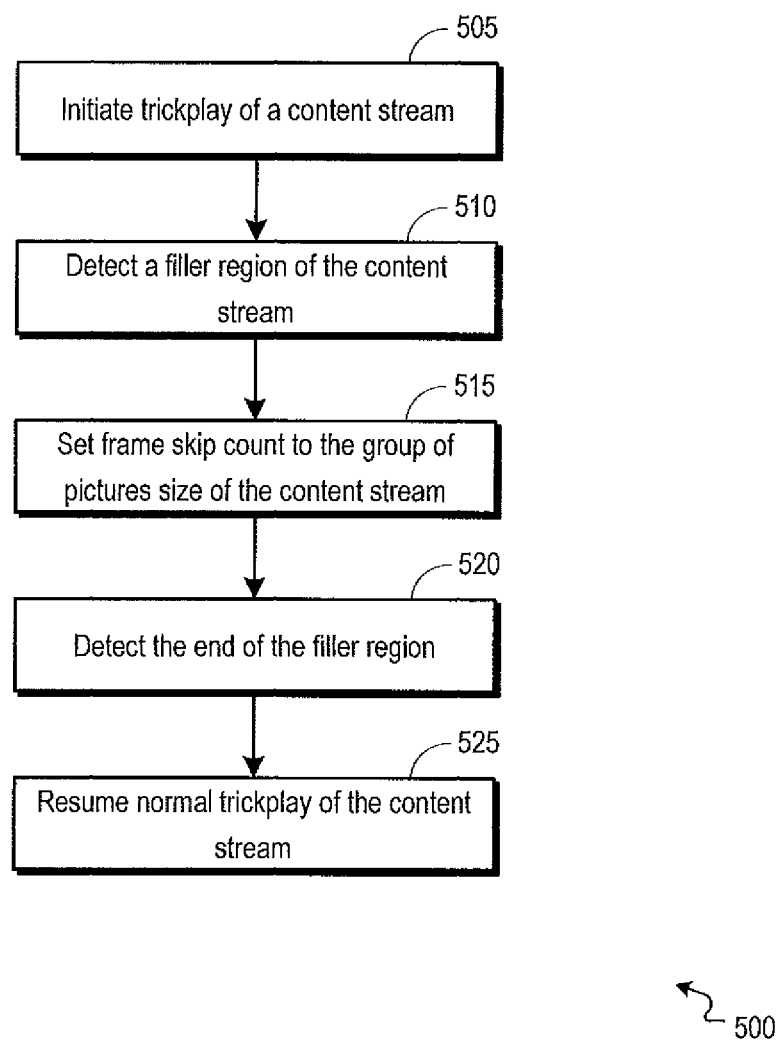
FIG. 5 is a flowchart illustrating an example process operable to facilitate the detection of a filler region and the modification of a frame skip count (FSC) value during trickplay of a content stream.

FIG. 5 is a flowchart illustrating an example process 500 operable to facilitate the detection of a filler region and the modification of a frame skip count (FSC) value during trickplay of a content stream. The process 500 may begin at 505 when a trickplay (e.g., rewind, fast-forward, skip, etc.) of a content stream is initiated. The content stream may be a recorded piece of content that is stored at a STB 105 of FIG. 1 (e.g., content data store 205 of FIG. 2). The recorded piece of content may include one or more targeted advertisement content segments, and each targeted advertisement content segment may be in between two filler regions. In embodiments, a filler region may include one or more consecutive I-frames.

In embodiments, the speed of a trickplay function may be controlled by the rate at which I-frames of the recorded content are fed from the content data store 205 to a sequencer 215 of FIG. 2 by a player 210 of FIG. 2. The speed of a trickplay function may further be controlled by the number of I-frames between I-frames that are consecutively fed to the sequencer 215. For example, the speed of a trickplay function may be managed by the setting of a FRC and/or FSC value at the STB 105.

At 510, a filler region of the content stream may be detected. A filler region may be detected, for example, by a STB 105 component (e.g., player 210, sequencer 215, filler trickplay module 230 of FIG. 2, etc.). In embodiments, a filler region may be detected based upon the type of frame following an I-frame. For example, a filler region may include one or more consecutive I-frames (e.g., at least one I-frame that is immediately followed in the content stream by another I-frame). A filler region may be detected by a filler trickplay module 230 when consecutive I-frames are returned by a sequencer 215.

At 515, a FSC value may be modified. The FSC value may be modified, for example, by a filler trickplay module 230. In embodiments, the FSC value may be set to a value that is equivalent to a group of pictures (GOP) size associated with the content stream. With the increase to the FSC value during trickplay of the filler region, a fewer number of filler frames may be processed and displayed by the STB 105 because a greater number of I-frames of the filler region may be skipped.

At 520, the end of the filler region may be detected. The end of the filler region may be detected, for example, by a STB 105 component (e.g., player 210, sequencer 215, filler trickplay module 230 of FIG. 2, etc.). In embodiments, the end of the filler region may be detected based on an identification of a non-consecutive I-frame (e.g., an I-frame that is not immediately followed by another I-frame). Once the end of the filler region is detected, the FSC value may be reset and normal trickplay of the content stream may be resumed at 525.

Figure 6:
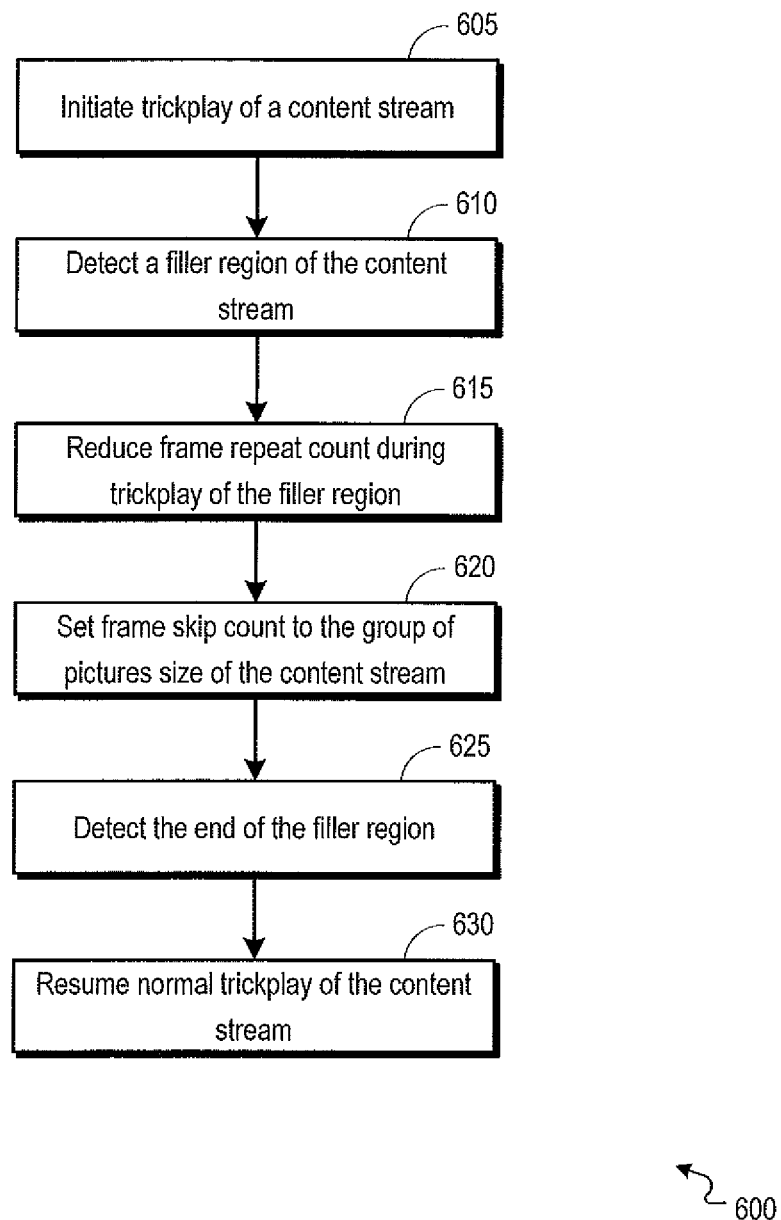
FIG. 6 is a flowchart illustrating an example process operable to facilitate the detection of a filler region and the modification of a frame repeat count (FRC) value and a frame skip count (FSC) value during trickplay of a content stream.

FIG. 6 is a flowchart illustrating an example process 600 operable to facilitate the detection of a filler region and the modification of a frame repeat count (FRC) value and a frame skip count (FSC) value during trickplay of a content stream. The process 600 may begin at 605 when a trickplay (e.g., rewind, fast-forward, skip, etc.) of a content stream is initiated. The content stream may be a recorded piece of content that is stored at a STB 105 of FIG. 1 (e.g., content data store 205 of FIG. 2). The recorded piece of content may include one or more targeted advertisement content segments, and each targeted advertisement content segment may be in between two filler regions. In embodiments, a filler region may include one or more consecutive I-frames.

In embodiments, the speed of a trickplay function may be controlled by the rate at which I-frames of the recorded content are fed from the content data store 205 to a sequencer 215 of FIG. 2 by a player 210 of FIG. 2. The speed of a trickplay function may further be controlled by the number of I-frames between I-frames that are consecutively fed to the sequencer 215. For example, the speed of a trickplay function may be managed by the setting of a FRC and/or FSC value at the STB 105.

At 610, a filler region of the content stream may be detected. A filler region may be detected, for example, by a STB 105 component (e.g., player 210, sequencer 215, filler trickplay module 230 of FIG. 2, etc.). In embodiments, a filler region may be detected based upon the type of frame following an I-frame. For example, a filler region may include one or more consecutive I-frames (e.g., at least one I-frame that is immediately followed in the content stream by another I-frame). A filler region may be detected by a filler trickplay module 230 when consecutive I-frames are returned by a sequencer 215.

At 615, a FRC value may be reduced during trickplay of the detected filler region. The FRC value may be reduced, for example, by a filler trickplay module 230. In embodiments, the FRC value may be dropped to a value of one (1), thus causing the I-frames of the filler region to be processed and output at a faster rate by the STB 105.

At 620, a FSC value may be modified. The FSC value may be modified, for example, by a filler trickplay module 230. In embodiments, the FSC value may be set to a value that is equivalent to a group of pictures (GOP) size associated with the content stream. With the increase to the FSC value during trickplay of the filler region, a fewer number of filler frames may be processed and displayed by the STB 105 because a greater number of I-frames of the filler region may be skipped.

At 625, the end of the filler region may be detected. The end of the filler region may be detected, for example, by a STB 105 component (e.g., player 210, sequencer 215, filler trickplay module 230 of FIG. 2, etc.). In embodiments, the end of the filler region may be detected based on an identification of a non-consecutive I-frame (e.g., an I-frame that is not immediately followed by another I-frame). Once the end of the filler region is detected, the FRC and FSC values may be reset and normal trickplay of the content stream may be resumed at 630.

Figure 7:
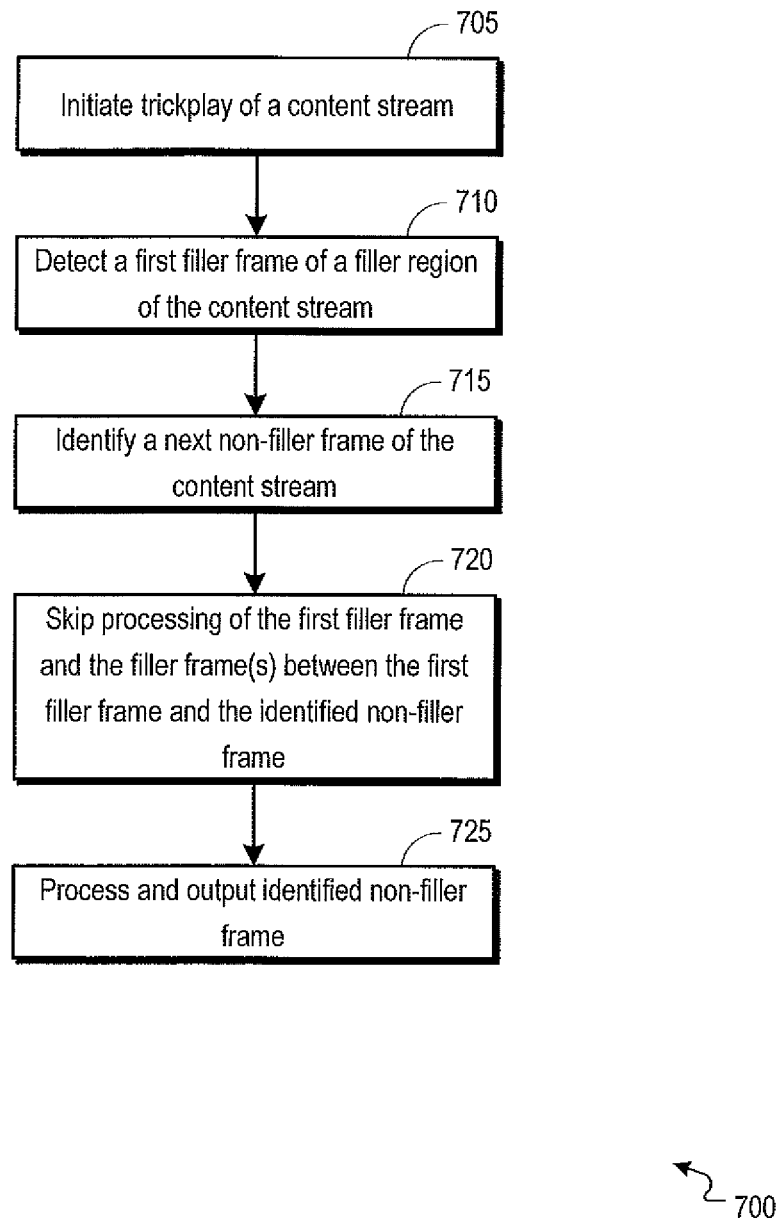
FIG. 7 is a flowchart illustrating an example process operable to facilitate the detection of one or more filler frames and the skipping of the filler frames during trickplay of a content stream.

FIG. 7 is a flowchart illustrating an example process 700 operable to facilitate the detection of one or more filler frames and the skipping of the filler frames during trickplay of a content stream. The process 700 may begin at 705 when a trickplay (e.g., rewind, fast-forward, skip, etc.) of a content stream is initiated. The content stream may be a recorded piece of content that is stored at a STB 105 of FIG. 1 (e.g., content data store 205 of FIG. 2). The recorded piece of content may include one or more targeted advertisement content segments, and each targeted advertisement content segment may be in between two filler regions. In embodiments, a filler region may include one or more consecutive I-frames.

At 710, a first filler frame of a filler region of the content stream may be detected. A first filler frame may be detected, for example, by a STB 105 component (e.g., player 210, sequencer 215, filler trickplay module 230 of FIG. 2, etc.). In embodiments, a filler region may be detected based upon the type of frame following an I-frame. For example, a filler region may include one or more consecutive I-frames (e.g., at least one I-frame that is immediately followed in the content stream by another I-frame). A filler region may be detected by a player 210 when consecutive I-frames are detected while the player 210 is searching through one or more indexes (e.g., indexes stored at the content data store 205) of the content stream to be fed to the sequencer 215.

At 715, a next non-filler frame of the content stream may be identified. The next non-filler frame may be identified, for example, by the player 210. In embodiments, the player 210 may search through the indexes associated with the content stream to identify the next I-frame following the first filler frame that is not immediately followed by another I-frame.

At 720, processing of the first filler frame and the one or more filler frames between the first filler frame and the identified non-filler frame may be skipped. For example, the player 210 may refrain from feeding the first filler frame and the filler frames between the first filler frame and the identified non-filler frame to the sequencer 215. The player 210 may skip over the filler frames (e.g., consecutive I-frames) and feed the next non-filler frame from the content data store 205 to the sequencer 215 for processing and output to a display device at 725.

Figure 8:
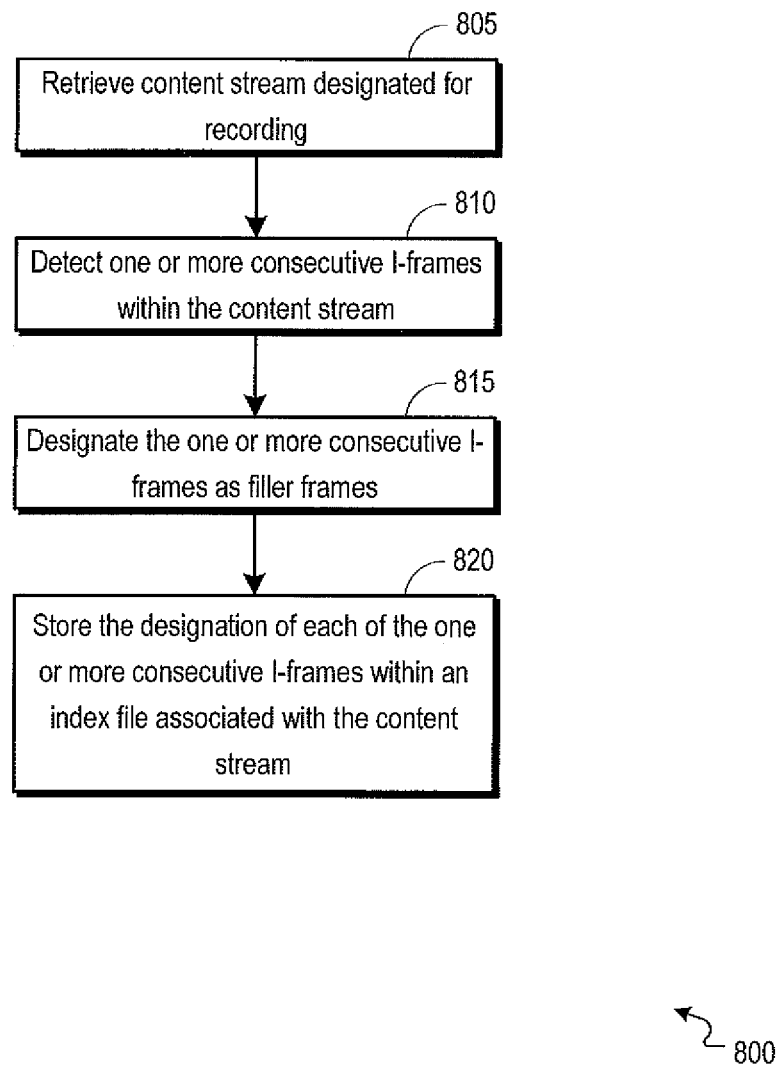
FIG. 8 is a flowchart illustrating an example process operable to facilitate the identification of consecutive I-frames within a content stream and the designation of the consecutive I-frames as filler frames.

FIG. 8 is a flowchart illustrating an example process 800 operable to facilitate the identification of consecutive I-frames within a content stream and the designation of the consecutive I-frames as filler frames. The process 800 may begin at 805 when a content stream designated for recording is received at a STB 105 of FIG. 1. The content stream may be recorded and stored at the STB 105 (e.g., at the content data store 205 of FIG. 2). The recorded piece of content may include one or more targeted advertisement content segments, and each targeted advertisement content segment may be in between two filler regions. In embodiments, a filler region may include one or more consecutive I-frames. It should be understood that the identification and designation of consecutive I-frames as filler frames may be carried out during a recording of the content stream or after a recording of the content stream.

At 810, one or more consecutive I-frames may be detected within the content stream being recorded. One or more consecutive I-frames may be detected, for example, by a frame modifier 235. In embodiments, the frame modifier 235 may determine that an I-frame that is immediately followed by another I-frame is a filler frame.

At 815, the one or more consecutive I-frames may be designated as filler frames. In embodiments, the frame modifier 235 may designate each consecutive I-frame as a filler frame. For example, the frame modifier 235 may modify each consecutive I-frame by adding a filler/non-filler designation field, and the filler/non-filler designation field may be populated with an indicator as to whether the I-frame is a filler frame or a non-filler frame. The I-frames including the filler/non-filler designation may be stored along with the content stream at 820. For example, the filler/non-filler designation of each I-frame may be stored within an index file associated with the content stream (e.g., at the content data store 205).

Figure 9:
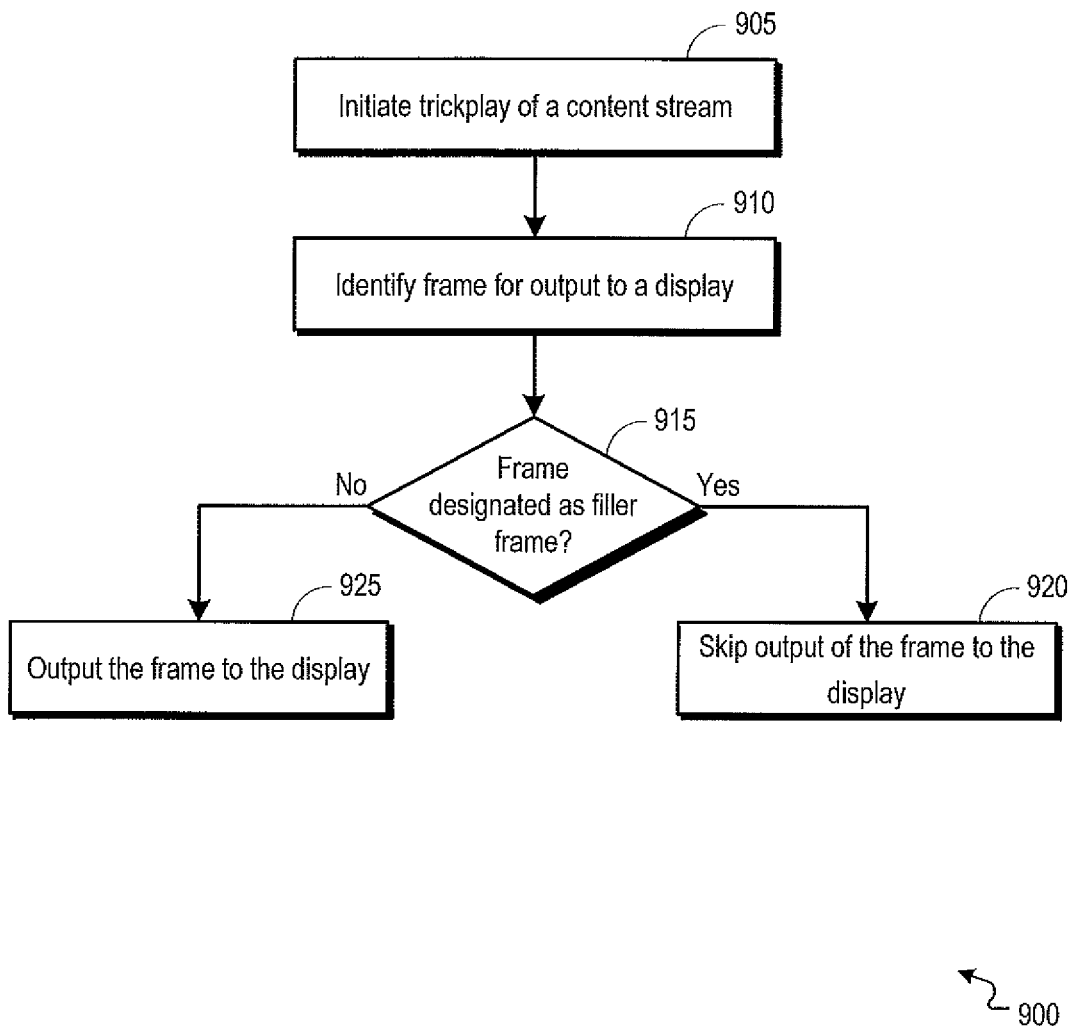
FIG. 9 is a flowchart illustrating an example process operable to facilitate the skipping of a frame during trickplay based on a designation of the frame as a filler frame.

FIG. 9 is a flowchart illustrating an example process 900 operable to facilitate the skipping of a frame during trickplay based on a designation of the frame as a filler frame. The process 900 may begin at 905 when a trickplay (e.g., rewind, fast-forward, skip, etc.) of a content stream is initiated. The content stream may be a recorded piece of content that is stored at a STB 105 of FIG. 1 (e.g., content data store 205 of FIG. 2). The recorded piece of content may include one or more targeted advertisement content segments, and each targeted advertisement content segment may be in between two filler regions. In embodiments, a filler region may include one or more consecutive I-frames.

At 910, a frame may be identified for processing and output to a display. For example, a player 210 of FIG. 2 may identify a next I-frame associated with a content stream from an index file stored at a content data store 205. In embodiments, the identified frame may include an identification of a frame type (e.g., I-frame, P-frame, B-frame, etc.) and may further include an indication of the frame's designation as either a filler frame or a non-filler frame.

At 915, the determination may be made whether the identified frame is designated as a filler frame. The determination may be made, for example, by a component of the STB 105 (e.g., player 210, filler trickplay module 230, etc.), and the determination may be based upon a filler/non-filler designation indicator stored within the frame or within an index file associated with the frame.

If, at 915, the determination is made that the identified frame is designated as a filler frame, the process 900 may proceed to 920. At 920, processing and output of the identified frame may be skipped. For example, the player 210 may forego feeding the identified frame from the content data store 205 to a sequencer 215 of FIG. 2.

If, at 920, the determination is made that the identified frame is not designated as a filler frame (e.g., the frame is designated as a non-filler frame), the process 900 may proceed to 925. At 925, the identified frame may be processed and output to a display device. For example, the player 210 may feed the identified frame from the content data store 205 to a sequencer, and the identified frame may be processed and prepared for output to a display device.

FIG. 10 is a block diagram illustrating an example frame index file 1000 associated with a piece of content. The frame index file 1000 may include several fields for each frame including, but not limited to a frame number field (e.g., 'Frame #'), a frame type field (e.g., 'Type'), and a filler/non-filler designation field (e.g., 'Filler'). The frame number field may identify a frame number associated with each frame. The frame type field may identify a frame type (e.g., I-frame, P-frame, B-frame) for each frame. The filler/non-filler designation field may provide an indication as to whether the corresponding frame is a filler or a non-filler frame. For example, a consecutive I-frame (e.g., an I-frame that is immediately followed by another I-frame (Frames 105, 106 and 107)) may be designated as a filler frame. A plurality of consecutive I-frames (Frames 105, 106 and 107) may make up a filler region.

Figure 11:
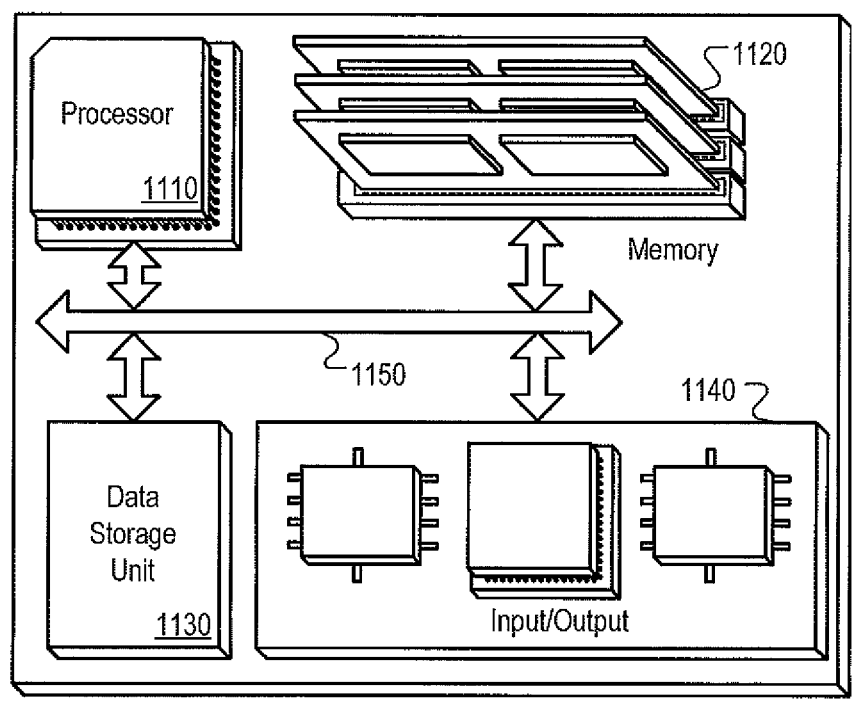
FIG. 11 is a block diagram of a hardware configuration operable to facilitate the detection and management of a filler region during trickplay of a content stream.

FIG. 11 is a block diagram of a hardware configuration 1100 operable to facilitate the detection and management of a filler region during trickplay of a content stream. The hardware configuration 1100 can include a processor 1110, a memory 1120, a storage device 1130, and an input/output device 1140. Each of the components 1110, 1120, 1130, and 1140 can, for example, be interconnected using a system bus 1150. The processor 1110 can be capable of processing instructions for execution within the hardware configuration 1100. In one implementation, the processor 1110 can be a single-threaded processor. In another implementation, the processor 1110 can be a multi-threaded processor. The processor 1110 can be capable of processing instructions stored in the memory 1120 or on the storage device 1130.

The memory 1120 can store information within the hardware configuration 1100. In one implementation, the memory 1120 can be a computer-readable medium. In one implementation, the memory 1120 can be a volatile memory unit. In another implementation, the memory 1120 can be a non-volatile memory unit.

In some implementations, the storage device 1130 can be capable of providing mass storage for the hardware configuration 1100. In one implementation, the storage device 1130 can be a computer-readable medium. In various different implementations, the storage device 1130 can, for example, include a hard disk device, an optical disk device, flash memory or some other large capacity storage device. In other implementations, the storage device 1130 can be a device external to the hardware configuration 1100.

The input/output device 1140 provides input/output operations for the hardware configuration 1100. In one implementation, the input/output device 1140 can include one or more of a network interface device (e.g., an Ethernet card), a serial communication device (e.g., an RS-232 port), one or more universal serial bus (USB) interfaces (e.g., a USB 2.0 port), one or more wireless interface devices (e.g., an 802.11 card), and/or one or more interfaces for outputting video and/or data services to a display device (e.g., television 110 of FIG. 1, computer, mobile device, tablet, etc.). In another implementation, the input/output device can include driver devices configured to send communications to, and receive communications from one or more networks (e.g., WAN 115 of FIG. 1, provider network 120 of FIG. 1, local network, etc.).

Those skilled in the art will appreciate that the invention improves upon methods and systems for carrying out a trickplay function on a filler region of a content stream. Methods, systems, and computer readable media can be operable to facilitate the detection and management of a filler region during trickplay of a content stream. A filler region at the edge of a targeted advertisement segment may be detected based on the presence of one or more consecutive I-frames. When a filler region is detected during a trickplay operation, a corrective method may be applied during trickplay of the filler region. The corrective method may include a modification of a frame skip count (FSC) and/or frame repeat count (FRC) during trickplay of the filler region, or may include skipping over the processing and output of filler frames during trickplay of the filler region. In embodiments, an index file may be modified to include an indication of a designation of one or more frames as either a filler frame or non-filler frame.

The subject matter of this disclosure, and components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD ROM disks. The processor and the memory can be supplemented by, or incorporated in, special purpose logic circuitry.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

We claim:

1. A method performed by a customer premise equipment device, the method comprising:
   receiving a content as a content stream including a filler region;
   identifying and designating consecutive I-frames of the content as filler frames for the filler region during recording of the content, wherein the consecutive I-frames are designated as filler frames within a modified index file field;
   initiating a trickplay of the content, the trickplay of the content comprising a processing and outputting of I-frames associated with the content to a display;
   detecting a beginning of the filler region based upon an identification of consecutive I-frames within the content stream, wherein the beginning of the filler region is detected by identifying a filler frame of the filler frames, wherein the filler frame comprises an I-frame that is immediately followed by another I-frame; and
   in response to detecting the beginning of the filler region during the trickplay of the content, modifying the processing of I-frames during trickplay of the filler region by changing frame count value to change speed for the trickplay of frames designated as filler frames and selecting only I-frames that are not designated as the filler frames for processing, wherein the I-frames are processed differently during trickplay of the filler region than a processing of I-frames during trickplay of one or more other portions of the content, and wherein the frame count value for trickplay of filler frames of the filler region is different from frame count value for trickplay of I-frames that are not designated as filler frames in other portions of the content.

2. The method of claim 1, wherein modifying the processing of I-frames during trickplay of the filler region by changing frame count value comprises reducing a frame repeat count value during trickplay of the filler region.

3. The method of claim 2, wherein the frame repeat count value is reduced to a value of one.

4. The method of claim 1, wherein modifying the processing of I-frames during trickplay of the filler region by changing frame count value comprises increasing a frame skip count value during trickplay of the filler region.

5. The method of claim 4, wherein the frame skip count value is increased to a value that is equivalent to a group of pictures size associated with a non-filler segment of the content.

6. The method of claim 1, wherein modifying the processing of I-frames during trickplay of the filler region by changing frame count value comprises reducing a frame repeat count value and increasing a frame skip count value during the trickplay of the filler region.

7. An apparatus comprising:
   an interface that receives a content as a content stream including a filler region; and
   one or more modules that:
   identifies and designates consecutive I-frames of the content as filler frames for the filler region during recording of the content, wherein the consecutive I-frames are designated as filler frames within a modified index file field;
   initiates a trickplay of the content, wherein trickplay of the content comprises a processing and outputting of I-frames associated with the content to a display;
   detects a beginning of the filler region based upon an identification of consecutive I-frames within the content stream, wherein the beginning of the filler region is detected by identifying a filler frame of the filler frames, wherein the filler frame comprises an I-frame that is immediately followed by another I-frame; and
   in response to detecting the beginning of the filler region during the trickplay of the content, modifies the processing of I-frames during trickplay of the filler region by changing frame count value to change speed for the trickplay of frames designated as filler frames and selecting only I-frames that are not designated as the filler frames for processing, wherein the I-frames are processed differently during trickplay of the filler region than a processing of I-frames during trickplay of one or more other portions of the content, and wherein the frame count value for trickplay of filler frames of the filler region is different from frame count value for trickplay of I-frames that are not designated as filler frames in other portions of the content.

8. The apparatus of claim 7, wherein the processing of I-frames during trickplay of the filler region by changing frame count value is modified by reducing a frame repeat count value during trickplay of the filler region.

9. The apparatus of claim 7, wherein the processing of I-frames during trickplay of the filler region by changing frame count value is modified by increasing a frame skip count value during trickplay of the filler region.

10. One or more non-transitory computer readable media having instructions operable to cause one or more processors to perform the operations comprising:
    receiving a content as a content stream including a filler region;
    identifying and designating consecutive I-frames of the content as filler frames for the filler region during recording of the content, wherein the consecutive I-frames are designated as filler frames within a modified index file field;
    initiating a trickplay of the content, the trickplay of the content comprising a processing and outputting of I-frames associated with the content to a display;
    detecting a beginning of the filler region based upon an identification of consecutive I-frames within the content stream, wherein the beginning of the filler region is detected by identifying a filler frame of the filler frames, wherein the filler frame comprises an I-frame that is immediately followed by another I-frame; and
    in response to detecting the beginning of the filler region during the trickplay of the content, modifying the processing of I-frames during trickplay of the filler region by changing frame count value to change speed for the trickplay of frames designated as filler frames and selecting only I-frames that are not designated as the filler frames for processing, wherein the I-frames are processed differently during trickplay of the filler region than a processing of I-frames during trickplay of one or more other portions of the content, and wherein the frame count value for trickplay of filler frames of the filler region is different from frame count value for trickplay of I-frames that are not designated as filler frames in other portions of the content.

11. The one or more non-transitory computer-readable media of claim 10, wherein modifying the processing of I-frames during trickplay of the filler region by changing frame count value comprises reducing a frame repeat count value during trickplay of the filler region.

12. The one or more non-transitory computer-readable media of claim 10, wherein modifying the processing of I-frames during trickplay of the filler region by changing frame count value comprises increasing a frame skip count value during trickplay of the filler region.

13. The one or more non-transitory computer-readable media of claim 12, wherein the frame skip count value is increased to a value that is equivalent to a group of pictures size associated with a non-filler segment of the content.

14. The one or more non-transitory computer-readable media of claim 10, wherein modifying the processing of I-frames during trickplay of the filler region by changing frame count value comprises reducing a frame repeat count value and increasing a frame skip count value during the trickplay of the filler region.

* * * * *